US006701275B1

United States Patent
Muratomi (10) Patent No.: US 6,701,275 B1
(45) Date of Patent: Mar. 2, 2004

(54) RPM CALCULATING APPARATUS FOR CONTROLLING ENGINE, CAPABLE OF EXPANDING HIGH RPM REGION WITHOUT CHANGING CALCULATION PERIOD

(75) Inventor: Yoshinori Muratomi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,595

(22) Filed: Nov. 12, 1999

(30) Foreign Application Priority Data

Apr. 28, 1999 (JP) .......................................... 11-122038

(51) Int. Cl.[7] ................................................ G01P 3/00
(52) U.S. Cl. ..................................................... 702/145
(58) Field of Search ................................ 702/145, 147, 702/148, 76, 79; 324/166

(56) References Cited

U.S. PATENT DOCUMENTS 4,240,388 A * 12/1980 Omari et al. ............ 123/406.35
4,274,142 A * 6/1981 Furuhashi et al. ............ 324/166
4,977,525 A * 12/1990 Blackwell .................... 324/166
5,168,220 A * 12/1992 Min ............................. 324/166
5,265,037 A * 11/1993 Izumi et al. ................. 324/166

FOREIGN PATENT DOCUMENTS

JP  6-81940  3/1994  ........... F16H/61/02

* cited by examiner

Primary Examiner—Michael Nghiem
(74) Attorney, Agent, or Firm—Sughrue Mion, PLLC

(57) ABSTRACT

In an engine-controlling rpm calculating apparatus, there are provided a rotary sensor for producing a detection pulse in response to an rpm related to the engine, and a microcomputer for calculating the rpm based upon the detection pulse so as to control the engine. The detection pulse contains a plurality of pulse series, and the microcomputer selects one pulse series from the plurality of pulse series in response to a drive region of the engine, and calculates the rpm related to the engine based upon both a detection time instant and the pulse number of the selected pulse series. As a result, the calculable high rpm region is expanded without changing the calculation time period, while the calculation capability of this rpm calculating apparatus with respect to the low rpm region is not deteriorated.

8 Claims, 5 Drawing Sheets

| RPM REGION | DETECTION PULSE PATTERN | RPM CALCULATION | CALCULATION RESULT APPLIED TO ENGINE CONTROL |
|---|---|---|---|
| LOW RPM REGION | PA | A | NA |
| INTERMEDIATE RPM REGION | PA | A, B | NA OR NB |
| HIGH RPM REGION | PB | B | NB |

RPM CALCULATING APPARATUS FOR CONTROLLING ENGINE, CAPABLE OF EXPANDING HIGH RPM REGION WITHOUT CHANGING CALCULATION PERIOD

BACKGROUND OF THE INVENTION

1. Field of the Invention

The present invention generally relates to an rpm (revolution per minute) calculating apparatus for calculating an rpm of an engine on the basis of a detection pulse derived from a rotary sensor used to control the engine. More specifically, the present invention is directed to such an rpm calculating apparatus for controlling an engine, capable of expanding a high rpm region calculable in an easy process operation without deteriorating a calculation capability with respect to a low rpm region while a calculation period is not changed.

2. Description of the Related Art

Conventionally, rpm calculating apparatuses for controlling engines are known in the field, in which rpms (revolution per minute) of engines are calculated based upon detection pulses derived from rotary sensors. For example, this type of rpm calculating apparatus is utilized in the transmission control apparatus described in Japanese Patent Application Laid-open No. Hei 6-81940.

Referring now to FIG. 6 to FIG. 9, the conventional rpm calculating apparatus for controlling the engine will be explained.

Figure 6:
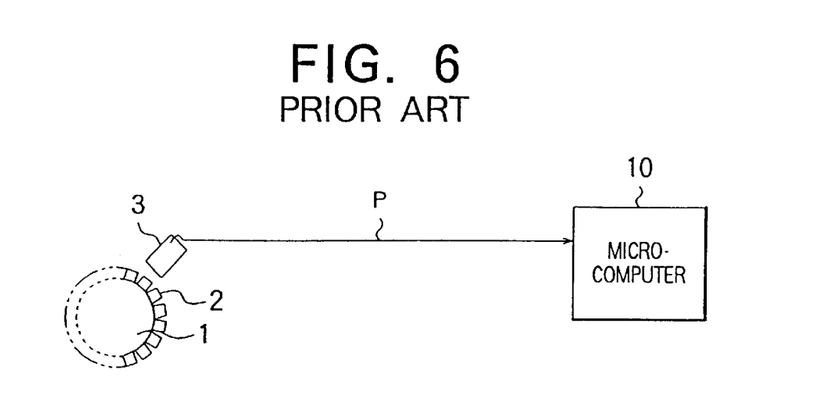
FIG. 6 is a block diagram for schematically showing the arrangement of a conventional rpm calculating apparatus for controlling the engine.
Figure 7:
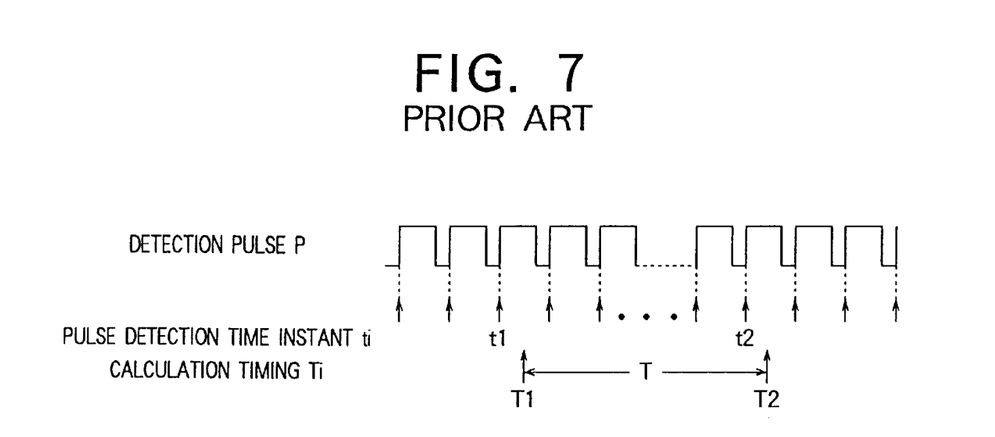
FIG. 7 is an explanatory diagram for explaining a pulse waveform and an operation timing of the conventional rpm calculating apparatus.
Figure 8:
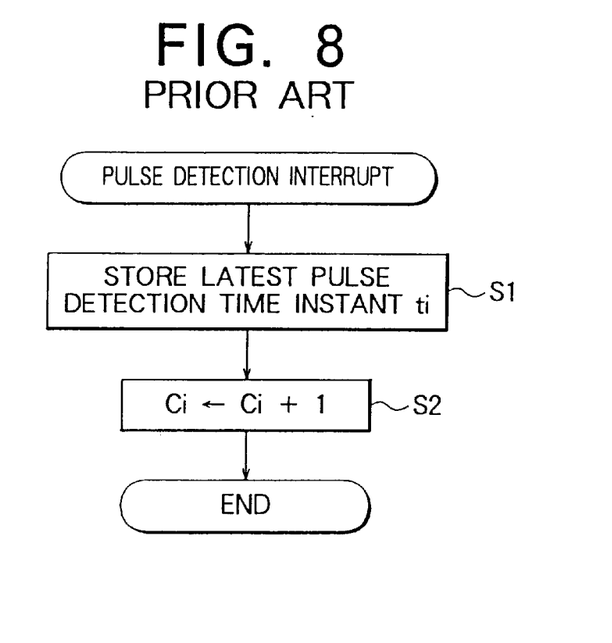
FIG. 8 is a flow chart for describing a pulse detection interrupt processing operation executed in the conventional rpm calculating apparatus.
Figure 9:
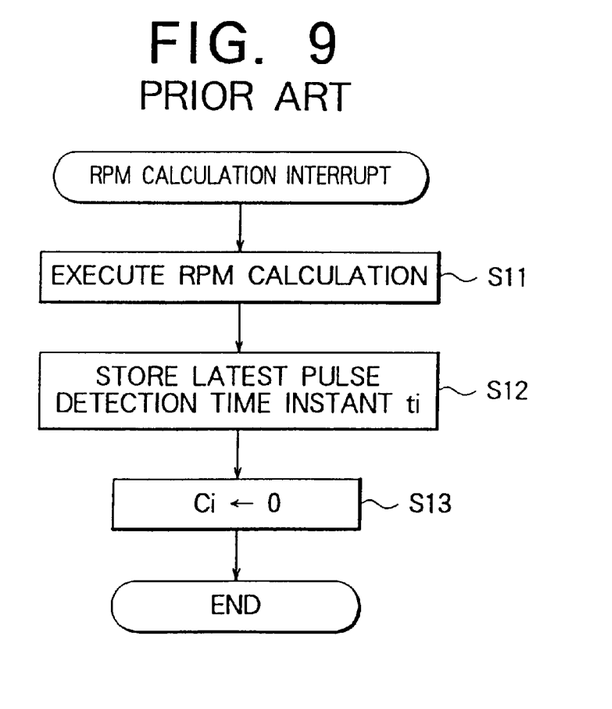
FIG. 9 is a flow chart for describing an rpm calculation interrupt processing operation executed in the conventional rpm calculating apparatus.

FIG. 6 is a block structural diagram for schematically showing the conventional rpm calculating apparatus for controlling the engine. FIG. 7 is an explanatory diagram for explaining a waveform of a detection pulse "P" derived from a rotary sensor, and also calculation timing. FIG. 8 is a flow chart for describing a pulse detection interrupt routine. FIG. 9 is a flow chart for describing an rpm calculation interrupt routine.

In FIG. 6, a rotary member 1 coupled to an engine (not shown) is provided in an integral manner with, for example, a crank shaft, and either an input shaft or an output shaft of an engine transmission for gear change purposes. A plurality of teeth 2 are formed along an outer peripheral portion of the rotary member 1 with a constant interval.

A rotary sensor 3 constructed of an electromagnetic pick-up and the like is positioned opposite to the teeth 2 of the rotary member 1, and produces a detection pulse "P" in response to an rpm of the rotary member 1. It is now assumed that the rotary sensor 3 contains a waveform shaping circuit used to produce such a detection pulse "P".

A microcomputer 10 calculates an rpm of an engine on the basis of the detection pulse "P" so as to control this engine. The microcomputer 10 constitutes a main body of this conventional rpm calculating apparatus for controlling the engine.

As indicated in FIG. 7, only timing (namely, detection time instant "ti") of one edge (for example, rising edge) of the detection pulse "P" derived from the rotary sensor 3 is guaranteed.

As a result, the microcomputer 10 detects only the rising edge of the detection pulse "P" as the pulse detection time instant "ti" and the pulse number, and then calculates an rpm "Ne" of the engine.

The rpm calculation is executed by the microcomputer 10 at calculation timing "Ti" every constant calculation period as indicated in FIG. 7.

For instance, as time instant information acquired at calculation timing T2, such pulse detection time instants "t1" and "t2" are used which have been stored immediately before the respective calculation timings "T1" and "T2".

Next, a pulse detecting operation executed by the microcomputer 10 will now be described with reference to FIG. 8.

The pulse detection interrupt routine of FIG. 8 is executed every time the rising edge of the detection pulse P is detected.

In other words, in FIG. 8, the microcomputer 10 stores the latest pulse detection time instant "ti" every time the rising edge of the detection pulse P is detected while sequentially updating the latest pulse detection time instant "ti" (step S1).

Subsequently, a counter value "Ci" for counting a pulse number is incremented (step S2), and then the pulse detection interrupt routine shown in FIG. 8 is ended by the microcomputer 10.

As a result, both the latest pulse detection time instant "ti" and the pulse number "Ci" counted from the preceding calculation timing are stored into a RAM of the microcomputer 10.

Referring now to FIG. 9, an rpm calculating operation of the microcomputer 10 will be described.

The rpm calculation interrupt routine of FIG. 9 is executed at calculation timing "Ti" every calculation time period "T".

That is, in FIG. 9, the microcomputer 10 executes the rpm calculation every predetermined calculation timing Ti (step S11).

For example, the rpm Ne at calculation timing "T2" indicated in FIG. 7 is calculated based upon the following equation (1):

$$Ne = (Np/M) \times \{(60 \times 10^6)/T12\} \quad (1).$$

It should be noted that in the above equation (1), symbol "Np" denotes a pulse number which is detected within the calculation time period "T" (namely, time period defined from the pulse detection time instants "ti" to "t2"); symbol "M", shows a pulse number (tooth number of the rotary member 1) which is detected while the rotary member 1 is rotated by 1 turn; and symbol "T12" denotes time defined from the pulse detection time instants "t1" to "t2". In this case, the time T12 is counted in unit of $(10^{-6})$ second.

Subsequently, the microcomputer 10 stores the latest pulse detection time instant "t2" at the present calculation timing T2 (step S12), and then clears the counter value Ci for counting the pulse (step S13). Thereafter, the rpm calculation interrupt routine shown in FIG. 9 is accomplished. As a result, the latest pulse detection time instant "ti" is updated every time the rpm calculation is carried out, and also the counter value Ci indicative of the pulse number is cleared as "0".

As previously explained, the microcomputer 10 stores the latest pulse detection time instant "ti", and counts the detection pulse number "Np" (see FIG. 8), and furthermore measures the time lapse "T12" (sec) of the pulse detection time instant within the calculation time period and the pulse number "Np". As a result, the microcomputer 10 can calculate the rpm "Ne" based upon the above-described equation (1) (see FIG. 9).

Generally speaking, in order to improve calculation precision of the rpm "Ne", it is preferable to detect a large quantity of pulse numbers "Np" as many as possible in the calculation time period "T" if the calculation process range is defined within the range for the calculation process capability of the microcomputer 10.

In the case that the rpm calculation is carried out based only on the rising edge of the detection pulse "P", for example, since the calculation time period "T" is set to a long time period, the low rpm region which can be calculated in high precision can be expanded up to the detection limit of the rotary sensor 3.

However, when the calculation time period T is set to such a long time period, since the detection pulse number Np in the calculation time period T within the high rpm region is increased, the total number of the respective process operations indicated in FIG. 8 and FIG. 9 is increased, so that the calculation loads of the microcomputer 10 are increased. As a result, the calculable high rpm region is narrowed within the processing capability of the microcomputer 10.

On the other hand, another solution is conceivable. For example, the calculation time period "T" may be set to be a short time period within the high rpm region. That is, the calculation timeperiod "T" may be switched in response to the rpm "Ne". However, the calculation control program is made complex.

In particular, when this solution method is applied to the transmission control of the engine, the control time period of the duty solenoid for driving a clutch is exclusively set, and the rpm calculation time period "T" is set identical to this control time period. As a consequence, it is practically difficult to switch the calculation time period "T".

As previously explained, in the conventional rpm calculating apparatus for controlling the engine, since the pulse number "Np" is counted in response to only the rising edge of a single pulse series constructed of the detection pulse "P", when the calculation time period "T" is set to a long time period so as to expand the calculable low rpm region, the calculation load of the microcomputer 10 exceeds the process capability of this microcomputer 10 in the high rpm region. As a consequence, there is such a problem that the calculable high rpm region is narrowed.

SUMMARY OF THE INVENTION

The present invention has been made to solve the above-described problems, and therefore, has an object to provide an rpm calculating apparatus for an engine control, capable of expanding a high rpm region calculable by an easy process without deteriorating calculation capability with respect to a low rpm region, while a calculation time period is not changed.

To achieve the object, an rpm calculating apparatus for controlling an engine, according to an aspect of the present invention, is featured by comprising: a rotary sensor for producing a detection pulse in response to an rpm related to the engine; and a microcomputer for calculating the rpm based upon said detection pulse so as to control the engine, wherein: the detection pulse contains a plurality of pulse series; and the microcomputer selects one pulse series from the plurality of pulse series in response to a drive region of the engine; and calculates the rpm related to the engine based upon both a detection time instant and the pulse number of the selected pulse series.

Also, an engine-controlling rpm calculating apparatus, according to another aspect of the present invention, is featured by that the engine-controlling rpm calculating apparatus is further comprised of a 1/2 frequency dividing circuit interposed between the rotary sensor and the microcomputer; wherein the 1/2 frequency dividing circuit frequency-divides the detection pulse derived from the rotary sensor to thereby produce a frequency division pulse containing a rising edge and a falling edge; and the microcomputer selectively detects at least one of the rising edge and the falling edge of the frequency division pulse, whereby two pulse series are substantially acquired by the microcomputer from the frequency division pulse.

Also, an engine-controlling rpm calculating apparatus, according to another aspect of the present invention, is featured by that the microcomputer calculates at least one of an input rpm and an output rpm of a transmission of the engine as the rpm related to the engine.

Also, an engine-controlling rpm calculating apparatus, according to another aspect of the present invention, is featured by that the microcomputer sets both a high rpm region and a low rpm region as a drive region of the engine; the microcomputer selects a pulse series whose pulse detection time period is long from the plurality of pulse series in the high rpm region; and the microcomputer selects a pulse series whose pulse detection time period is short from the plurality of pulse series in the low rpm region.

Also, an engine-controlling rpm calculating apparatus, according to another aspect of the present invention, is featured by that the microcomputer sets as the drive region of the engine an intermediate rpm region between the high rpm region and the low rpm region; and the microcomputer switches a pulse series selected in the intermediate rpm region.

Also, an engine-controlling rpm calculating apparatus, according to another aspect of the present invention, is featured by that the microcomputer calculates rpms based on the plurality of pulse series in the intermediate rpm region; and in the case that the respective rpms calculated based upon the plurality of pulse series are made coincident with each other, the microcomputer selects the pulse series to be selected.

Furthermore, an engine-controlling rpm calculating apparatus, according to another aspect of the present invention, is featured by that in the case that the respective rpms calculated based upon the plurality of pulse series are not made coincident with each other in the entire region of the intermediate rpm region, when at least one of the respective rpms is larger than, or equal to an upper limit value of the intermediate rpm region, the microcomputer forcibly switches the present pulse series to such a pulse series corresponding to the high rpm region; and when at least one of the respective rpms is smaller than, or equal to a lower limit value of the intermediate rpm region, the microcomputer forcibly switches the present pulse series to such a pulse series corresponding to the low rpm region.

BRIEF DESCRIPTION OF THE DRAWINGS

A better understanding of the present invention may be achieved by reading a detached description with reference to the accompanying drawings, in which.

DETAILED DESCRIPTION OF THE PREFERRED EMBODIMENTS

Embodiment 1

Now, an rpm calculating apparatus for controlling an engine, according to an embodiment 1 of the present invention, will be described more in detail with reference to FIG. 1 to FIG. 5.

Figure 1:
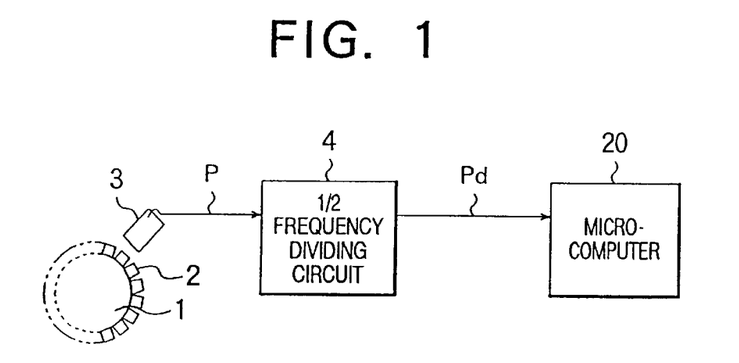
FIG. 1 is a block diagram for schematically showing an arrangement of an rpm calculating apparatus for controlling an engine according to an embodiment 1 of the present invention.

FIG. 1 is a block diagram for schematically showing an arrangement of an rpm calculating apparatus for controlling an engine according to this embodiment 1 of the present invention.

Figure 2:
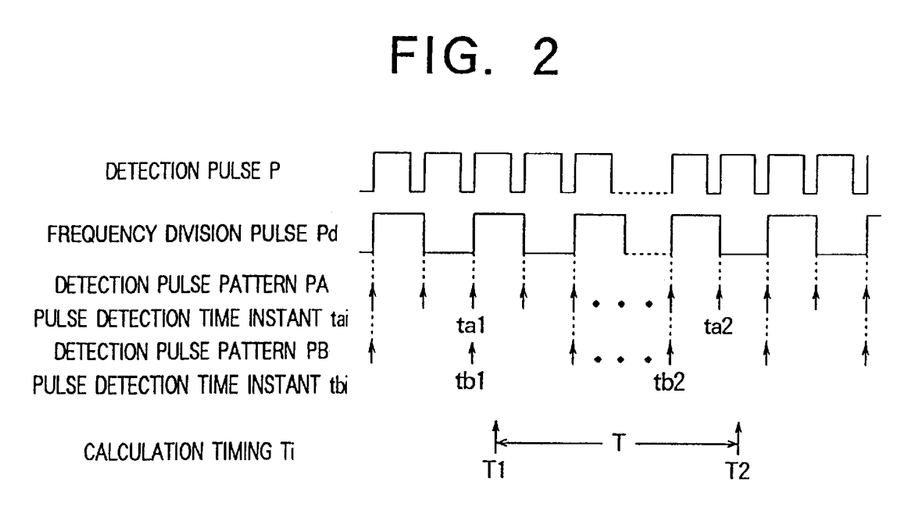
FIG. 2 is an explanatory diagram for explaining a pulse waveform and an operation timing of the rpm calculating apparatus according to the embodiment 1 of the present invention.
Figure 3:
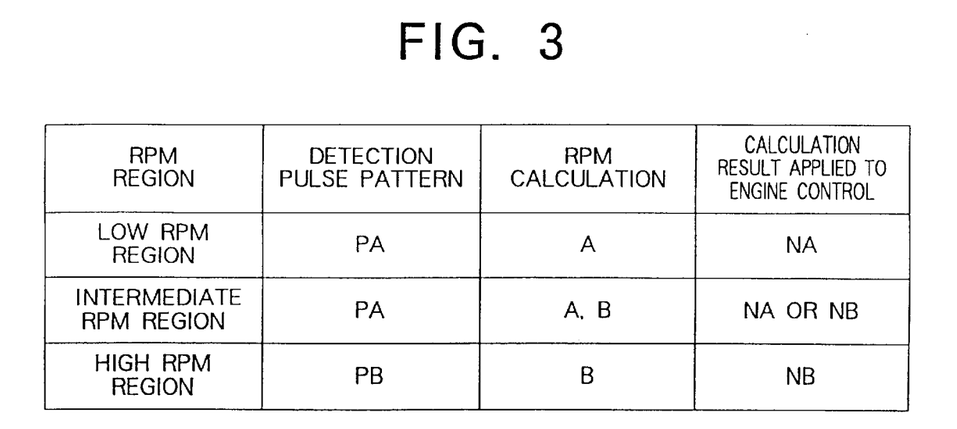
FIG. 3 is an explanatory diagram for explaining a calculation process operation with respect to each of rpm regions, executed in the rpm calculating apparatus of the embodiment 1.
Figure 4:
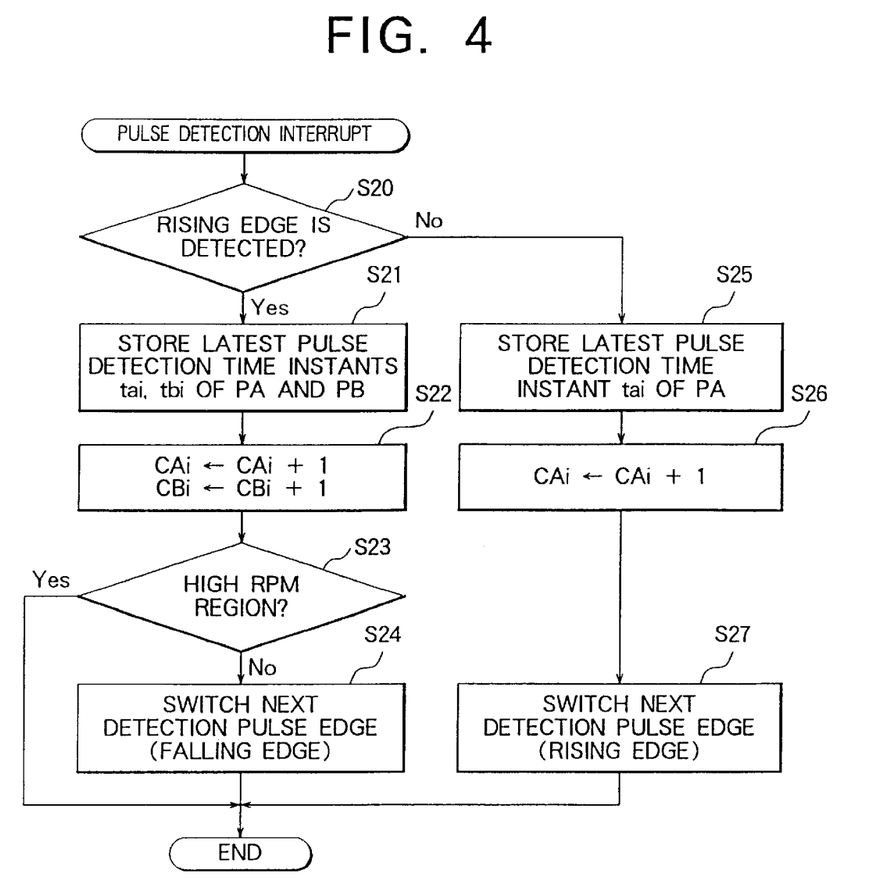
FIG. 4 is a flow chart for describing a pulse detection interrupt processing operation executed in the rpm calculating apparatus according to the embodiment 1 of the present invention.
Figure 5:
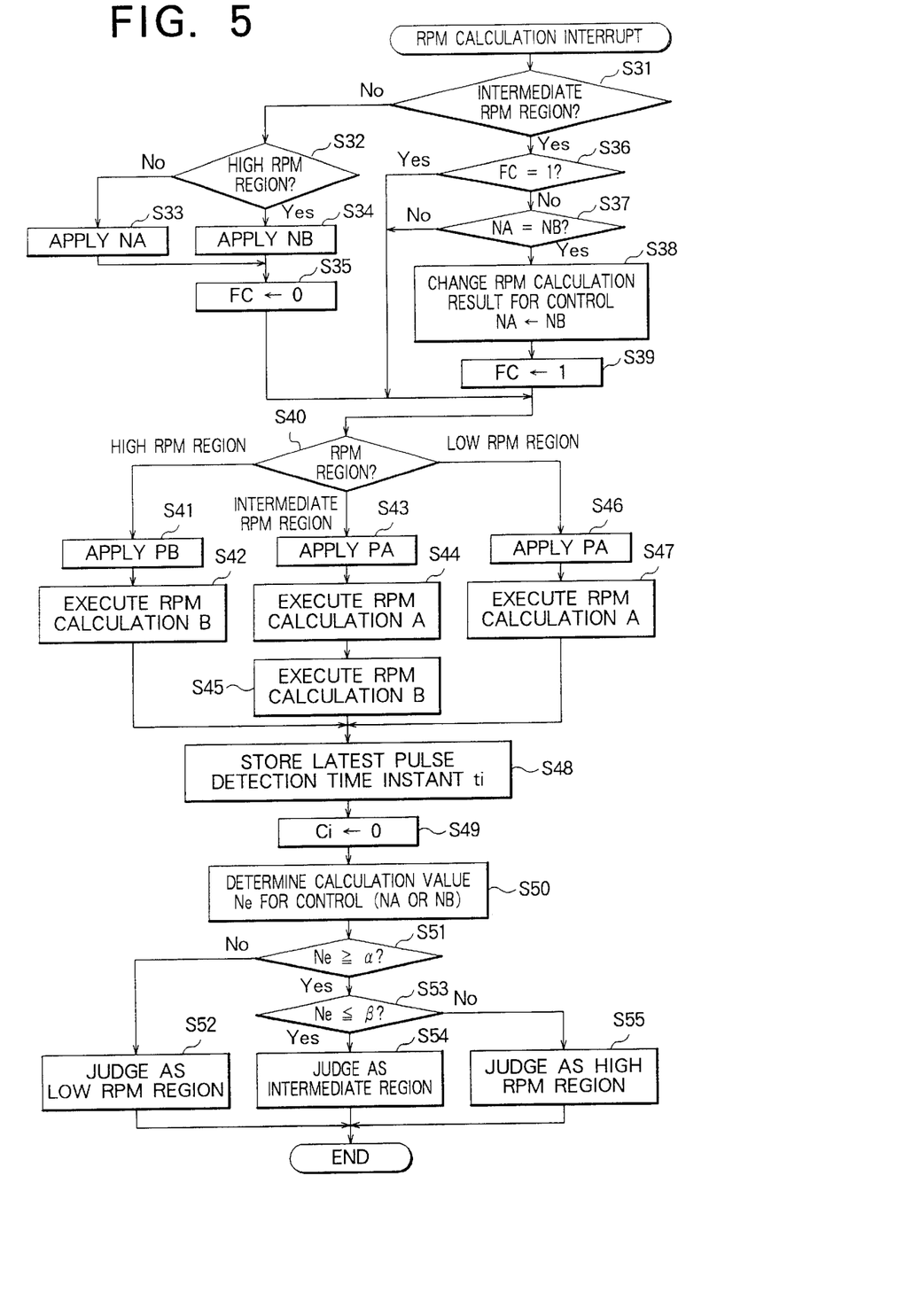
FIG. 5 is a flow chart for describing an rpm calculation interrupt processing operation executed in the rpm calculating apparatus according to the embodiment 1 of the present invention.

FIG. 2 is an explanatory diagram for showing calculation timing in combination with a detection pulse "P" and a frequency division pulse "Pd". FIG. 3 is an explanatory diagram for explaining a calculation process operation with respect to an rpm region. FIG. 4 is a flow chart for describing a pulse detection interrupt routine. FIG. 5 is a flow chart for describing an rpm calculation interrupt routine.

It should be noted that the same reference numerals shown in FIG. 6 will be employed as those for denoting the same, or similar elements of FIG. 1, and detailed descriptions thereof are omitted. Also, in FIG. 1, a microcomputer 20 corresponds to the above-explained microcomputer 10.

A 1/2 frequency dividing circuit 4 interposed between a rotary sensor 3 and a microcomputer 20 frequency-divides a detection pulse "P" derived from the rotary sensor 3 to produce a frequency division pulse "Pd". This frequency division pulse "Pd" contains a rising edge, and a falling edge in high precision.

The frequency division pulse Pd is entered into the microcomputer 20 as a detection pulse containing two pulse series.

In this case, the microcomputer 20 includes an rpm region setting means. This rpm region setting means sets as a drive region of an engine, a high rpm region and a low rpm region, and furthermore, an intermediate rpm region located between the high rpm region and the low rpm region.

Also, the microcomputer 20 selects one pulse series from the two pulse series in accordance with the engine drive region (namely, rpm region), and also calculates an rpm "Ne" based upon a detection time instant and a pulse number of the selected pulse series.

That is, as shown in FIG. 2, since the microcomputer 20 selectively detects at least one of the rising edge of the frequency division pulse Pd and the falling edge thereof, this microcomputer 20 essentially acquires two sets of pulse series from the frequency division pulse Pd.

In FIG. 2, a calculation time period "T", and calculation timings "Ti", "T1", and "T2" are similar to those of FIG. 7. A pulse detection time instant "tai" shown in FIG. 2 corresponds to the above-explained pulse detection time instant "ti". All of the edges of the frequency division pulse Pd may be detected in high precision.

In this case, the rising edge of the frequency division pulse Pd and the falling edge thereof correspond to the rising edges of the detection pulse P, and thus, all of the edges of the frequency division pulse Pd can be detected in high precision.

A detection pulse pattern PA which constitutes a first pulse series corresponds to all of the edges of the frequency division pulse Pd. Since the time period of the pulse detection time instant "tai" is short, this detection pulse pattern PA is used in the rpm calculation executed in the low rpm region.

Another detection pulse pattern PB which constitutes a second pulse series corresponds to only the rising edges of the frequency division pulse Pd. Since the time period of the pulse detection time instant "tbi" is long, this detection pulse pattern PB is used in the rpm calculation executed in the high rpm region.

The microcomputer 20 selects the pulse series having the short pulse detection time period, namely the detection pulse pattern PA in the low rpm region, whereas this microcomputer 20 selects the pulse series having the long pulse detection time period, namely the detection pulse pattern PB in the high rpm region.

Also, in order to switch a pulse series to be selected in the intermediate rpm region, the microcomputer 20 calculates an rpm "NA" and another rpm "NB" based upon the respective pulse series "PA" and "PB". When the calculated rpms NA and NB are made coincident with each other, the microcomputer 20 switches the pulse series to be selected.

Furthermore, in the case that the respective rpms calculated based upon a plurality of pulse series are not made coincident with each other over the entire region of the intermediate rpm region, the microcomputer 20 forcibly switches the pulse series both in an upper limit value and a lower limit value of the intermediate rpm region.

For example, when at least one of the rpms "NA" and "NB" indicates the value larger than, or equal to the upper limit value of the intermediate rpm region, the microcomputer 20 forcibly switches the present pulse series to the pulse series PB corresponding to the high rpm region.

Also, when at least one of the rpms "NA" and "NB" indicates the value smaller than, or equal to the lower limit value of the intermediate rpm region, the microcomputer 20 forcibly switch the present pulse series to the pulse series PA corresponding to the low rpm region.

As previously explained, process patterns selected in correspondence with the respective rpm regions are represented in FIG. 3. In FIG. 3, the intermediate rpm region is set to a region on the order of 3,000 rpm to 4,000 rpm.

In other words, in the low rpm region (smaller than, or equal to 3,000 rpm), the detection pulse pattern PA is selected, and the calculation result "NA" obtained based on the rpm calculation "A" is employed as the controlling rpm "Ne".

Also, in the intermediate rpm region (3,000 rpm to 4,000 rpm), both the rpm calculation "A" and the rpm calculation "B" made based upon the detection pulse pattern PA are selected, and either the calculation result "NA" or the calculation result "NB" is employed as the controlling rpm "Ne".

Furthermore, in the high rpm region (larger than, or equal to 4,000 rpm), the rpm calculation B based on the detection pulse pattern PB is selected, and the calculation result "NB" is employed as the controlling rpm "Ne".

Next, concrete operations of the rpm calculating apparatus for controlling the engine, according to the embodiment 1 of the present invention, will be described with reference to flow charts shown in FIG. 4 and FIG. 5 in combination with FIG. 2 and FIG. 3.

A first description is made of a pulse detection interrupt routine shown in FIG. 4. It is now assumed that the interrupt routine of FIG. 4 is initially set to be initiated in response to the rising edge of the frequency division pulse Pd.

In FIG. 4, both steps S21 and S25 correspond to the above-described step S1 (see FIG. 8), and both steps S22 and S26 correspond to the above-explained step S2.

First, when an edge of the frequency division pulse Pd is detected, the microcomputer 20 judges as to whether or not the detected edge corresponds to the rising edge (step S20).

If the microcomputer 20 judges that the detected edge is identical to the rising edge (namely, YES), then the microcomputer 20 updates the latest pulse detection time instants "tai" and "tbi" of the respective detection pulse patterns PA and PB to store thereinto the updated latest pulse detection time instants "tai" and "tbi" (step S21). Also, this microcomputer 20 increments the pulse counting counter values "CAi" and "CBi" of the detection pulse patterns PA and PB (step S22).

Subsequently, the microprocessor 20 judges as to whether or not the present engine drive condition corresponds to the high rpm region with reference to an rpm region flag set by the rpm setting means (step S23).

If the microprocessor 20 judges that the present engine drive condition corresponds to the high rpm region (namely, YES), then the interrupt routine of FIG. 4 is directly accomplished.

As a result, in such a case that the rising edge of the frequency division pulse Pd is subsequently detected, the interrupt routine shown in FIG. 4 is again initiated.

Accordingly, the counter values CAi and CBi are continued to be incremented every time the rising edge of the frequency division pulse Pd is detected at step S22.

On the other hand, when the microcomputer 20 judges that the present engine drive region corresponds to either the intermediate rpm region or the low rpm region, but does not correspond to the high rpm region (namely, NO), the detection pulse edge in the next operation is switched to the falling edge (step S24), and then the interrupt routine of FIG. 4 is ended.

As a consequence, in the case that the falling edge of the frequency division pulse Pd is subsequently detected, the interrupt routine of FIG. 4 is initiated.

In this case, since the microprocessor 20 judges at step S20 that the detected edge does not correspond to the rising edge (namely, NO), the process operation is advanced to a step S25. At this step S25, the microcomputer 20 updates the latest pulse detection time instant "tai" of the detection pulse pattern PA and then stores thereinto the updated latest pulse detection time instant "tai".

Subsequently, the microcomputer 20 increments the pulse counting counter value "CAi" of the detection pulse pattern PA (step S26), and thereafter switches the next detection pulse edge to the rising edge (step S27), and then the interrupt routine shown in FIG. 4 is accomplished.

As a consequence, in the case that the rising edge of the frequency division pulse Pd is subsequently detected, the interrupt routine of FIG. 4 is initiated.

In other words, when the present engine drive condition does not correspond to the high rpm region, the counter value CAi is alternately incremented at steps S22 and S26 every time both the rising edge and the falling edge are detected. As a consequence, the counter value CAi for the detection pulse pattern PA is incremented at a speed two times higher than the speed at which the counter value CBi for the detection pulse pattern PB is incremented.

Next, the rpm calculation interrupt routine shown in FIG. 5 will now be explained.

Similar to the above-described interrupt routine (see FIG. 9), this interrupt routine of FIG. 5 is executed every time calculation timing "Ti".

First, in FIG. 5, the microcomputer 20 judges as to whether or not the present engine drive condition corresponds to the intermediate rpm region with reference to a judgement flag of an rpm region (will be discussed later) (at step S31).

When the microcomputer 20 judges that the present engine drive condition does not correspond to the intermediate rpm region (namely, NO), the microcomputer 20 subsequently judges as to whether or not the present drive condition corresponds to the high rpm region (step S32). If the microcomputer 20 judges that the present derive condition does not correspond to the high rpm region (namely, NO), then the present drive condition corresponds to the low rpm region, so that the calculation result "NA" of the rpm calculation "A" calculated based upon the detection pulse pattern PA is applied to the engine control (step S33).

On the other hand, when the microcomputer 20 judges that the present engine drive condition corresponds to the high rpm region (namely YES), the calculation result NB of the rpm calculation B calculated based upon the detection pulse pattern PB is applied to the engine control (step S34).

Subsequent to either the step S33 or the step S34, a switch completion judgement flag "FC" of the detection pulse pattern is cleared to "0" (step S35), and then the interrupt operation is advanced to a step S40.

On the other hand, when the microcomputer 20 judges at the step S31 that the present engine drive condition corresponds to the intermediate rpm region (namely, YES), the microcomputer 20 judges as to whether or not the switch completion judgement flag FC corresponds to "1" (step S36).

If the microcomputer 20 judges that the switch completion judgement flag FC=1 (namely, YES), then since switching of the detection pulse pattern (rpm calculation) has already been accomplished, the rpm calculation interrupt routine is immediately advanced to a step S40.

To the contrary, if the microcomputer 20 judges at the step S36 that FC=0 (namely, NO), then since switching of the detection pulse pattern (rpm calculation) is not yet completed, the microcomputer 20 judges as to whether or not the calculation result NA of the rpm calculation A calculated based upon the detection pulse pattern PA is made coincident with the calculation result NB of the rpm calculation B calculated based on the detection pulse pattern PB (step S37). If the microcomputer 20 judges that the calculation result NA is not made coincident with the calculation result NB (namely, NO), then the interrupt process is immediately advanced to the step S40. Conversely, if the microcomputer 20 judges that NA=NB (namely YES), then since this condition can satisfy the switching condition of the detection pulse pattern (rpm calculation), the microcomputer 20 changes the calculation result applied to the engine control (step S38).

In other words, in the case that the calculation result NA of the rpm calculation A calculated based upon the detection pulse pattern PA has been so far applied to the engine control, another calculation result NB of the rpm calculation B calculated based on the detection pulse pattern PB is applied to this engine control from the next time.

Also, in the case that the calculation result NB of the rpm calculation B calculated based upon the detection pulse pattern PB has been so far applied to the engine control, another calculation result NA of the rpm calculation A calculated based on the detection pulse pattern PA is applied to this engine control from the next time.

Subsequently, the switching completion judgement flag FC of the detection pulse pattern is set to "1" (step S39), and then the interrupt operation is advanced to the step S40.

At the step S40, the microcomputer 20 judges the present rpm region with reference to again the rpm region judgement flag.

When the microcomputer 20 judges that the present engine drive condition corresponds to the high rpm region, the detection pulse pattern PB is applied (step S41), and the rpm calculation B is executed (step S42). Then, the interrupt process is advanced to a step S48.

Also, when the microcomputer 20 judges at the step S40 that the present engine drive condition corresponds to the intermediate rpm region, the detection pulse pattern PA is applied (step S43), the rpm calculation A is executed (step S44), and further the rpm calculation B is executed (step S45). Then, the interrupt process is advanced to the step S48.

Furthermore, when the microcomputer 20 judges at the step S40 that the present engine drive condition corresponds to the low rpm region, the detection pulse pattern PA is applied (step S46), and the rpm calculation A is executed (step S47). Then, the interrupt process is advanced to the step S48.

In the respective rpm calculation steps S42, S44, S45, and S47, the calculation results NA and NB are calculated based upon the above-explained formula (1) by the pulse detection time instant that has been stored at the preceding calculation timing, the pulse detection time instant that is stored immediately before the present calculation timing, and also both the counter values CAi and CBi.

In other words, the microcomputer 20 selects two sorts of the detection pulse patterns PA and PB by setting the detection edges of the frequency division pulse Pd, and executes two sorts of below-mentioned rpm calculations A and B at the calculation timing T2 (see FIG. 2) of the calculation time period T.

For example, in the case that the microcomputer 20 selects the detection pulse pattern PA in the low rpm region, the microcomputer 20 calculates the calculation result "NA" by employing a total number "Nap" of detection pulses defined from the pulse detection time instant "ta1" to the pulse detection time instant "ta2" (not involve pulse at time instant "ta1"), a pulse number "M" per 1 revolution, and lapsed time "Ta12", defined from the pulse detection time instant "ta1", to the pulse detection time instant "ta2", as follows:

$$NA = (Nap/M) \times \{(60 \times 10^6)/Ta12\}$$

Also, in the case that the microcomputer 20 selects the detection pulse pattern PB in the high rpm region, the microcomputer 20 calculates the calculation result "NB" by employing a total number "Nbp" of detection pulses defined from the pulse detection time instant "tb1" to the pulse detection time instant "tb2" (not involve pulse at time instant "tb1"), a pulse number "M/2" per 1 revolution, and lapsed time "Tb12" defined from the pulse detection time instant "tb1" to the pulse detection time instant "tb2" as follows:

$$NB = \{Nbp/(M/2)\} \times \{(60 \times 10^6)/Tb12\}$$

In addition, while the detection pulse pattern PA is applied in the intermediate rpm region, both the rpm calculations A and B are executed. At this time, since the detection pulse pattern PA contains the detection pulse pattern PB, both the rpm calculations A and B can be selected when the detection pulse pattern PA is applied.

Next, at the step S48, the microcomputer 20 acquires the latest pulse detection time instant "ti" (either "tai" or "tbi") to be stored, which has been stored at the time instant of the present calculation timing Ti as time instant data that is used in the next rpm calculation.

Subsequently, in order to count the number of detection pulse used in the next rpm calculation, the microcomputer 20 clears the counter value Ci (both CAi and CBi) to a zero value (step S49), and then determines either the calculation result NA or NB as a final calculation value (namely, rpm "Ne") applied to the engine control (step S50).

In other words, as the rpm "Ne" applied to the engine control, the result NA of the rpm calculation A is set in the low rpm region; the result NB of the rpm calculation B is set in the high rpm region; and the results NA and NB of the rpm calculations A and B are set in such a manner that these results NA and NB are switched at the coincident timing in the intermediate rpm region.

Next, in order to judge an rpm region after the rpm calculation, the microcomputer compares the rpm Ne determined at the previous step S50 with the lower limit value "α" (=3,000 rpm) of the intermediate rpm region so as to judge whether or not this rpm Ne is larger than, or equal to the lower limit value "α" (step S51).

When the microcomputer 20 judges that Ne<α (namely, NO), this rpm region corresponds to the low rpm region. As a result, the microcomputer 20 sets a judgement flag of the low rpm region to "1" (step S52), and then the interrupt routine of FIG. 5 is ended.

On the other hand, when the microcomputer 20 judges that Ne larger than, or equal to "α" (namely, YES), then the microcomputer compares the rpm Ne determined at the previous step S51 with the upper limit value "β" (=4,000 rpm) of the intermediate rpm region so as to judge whether or not this rpm Ne is smaller than, or equal to the upper limit value "β" (step S53).

When the microcomputer 20 judges that Ne smaller than, or equal to β (namely, YES), this rpm region corresponds to the intermediate rpm region. As a result, the microcomputer 20 sets a judgement flag of the intermediate rpm region to "1" (step S54), and then the interrupt routine of FIG. 5 is ended.

On the other hand, when the microcomputer 20 judges that Ne>β (namely, NO) at the step S53, this rpm region corresponds to the high rpm region. As a result, the microcomputer 20 sets a judgement flag of the high rpm region to "1" (step S55), and then the interrupt routine of FIG. 5 is ended.

The judgement results of the rpm regions obtained at the respective steps S52, S54, and S55 are used in the next rpm calculation.

As previously explained, the detection pulse P derived from the rotary sensor 3 is entered via the 1/2 frequency dividing circuit 4 to the microcomputer 20 as the frequency division pulse Pd. Both detection pulse patterns and rpm calculations can be switched in correspondence with the respective rpm regions.

As a consequence, in the low rpm region, it is possible to obtain the calculation result NA in high precision calculated based upon a sufficiently large number of pulses in a similar manner to the conventional rpm calculating apparatus. In the high rpm region, the high-precision calculation result NB can be obtained within the process capability range by the microcomputer 20 based upon the 1/2-reduced pulse number without changing the calculation time period "T". As a result, the calculable rpm region can be expanded.

Also, since the intermediate rpm region is provided between the low rpm region and the high rpm region, and the detection pulse pattern (rpm calculation) is switched in the intermediate rpm region, the detection pulse pattern can be switched, for example, in such an rpm region separated from a gear changing point of a transmission, so that no adverse influence is given to the transmission control.

Furthermore, when the calculation result "NA" for the low rpm region is equal to the calculation result "NB" for the high rpm region in the intermediate rpm region (step S37), both the detection pulse pattern and the rpm calculation are switched (step S38). As a consequence, the variation in the rpms that occurs when the detection pulse pattern and the rpm calculation are switched can be suppressed to the minimum value, and the calculations can be switched while maintaining the correct rpm Ne.

In particular, in the case that the transmission of the engine is controlled, the differential value of the rpm Ne is employed so as to improve the control precision. When the rpm calculation values are made coincident with each other, if the rpm calculation is not switched, then the differential value is largely varied and the continuity of the control operation is lost. Accordingly, the above-described switching condition is the necessary condition.

Even when the condition NA=NB cannot be established in the intermediate region, at the time when rpm Ne is smaller than, or equal to the lower limit value "α" of the lower rpm region (step S52), the present calculation is forcibly switched to the calculation "A" for the low rpm region (steps S46 and S47), and also at the time when the rpm Ne is larger than or equal to the upper limit value "β" of the intermediate region (step S55), the present calculation is forcibly switched to the calculation "B" for the high rpm region (steps S41 and S42). As a consequence, it is possible to execute the rpm calculation adapted to the rpm region in view of back-up function.

Embodiment 2

Although no concrete subject has been described as to the rpm calculation subject (control subject) in the above-described embodiment 1, at least one of an input rpm of the transmission (output rpm of engine) and an output rpm thereof may be employed as the calculation subject.

Embodiment 3

Also, the 1/2 frequency dividing circuit 4 is employed so as to set a plurality of detection pulse patterns in the above-explained embodiment 1. Alternatively, a 1/4 frequency dividing circuit may be employed.

Furthermore, the two pulse series are set via the 1/2 frequency dividing circuit 4. Alternatively, more than three pulse series may be set.

Embodiment 4

In the above-explained embodiment 1, the 1/2 frequency dividing circuit 4 is used so as to produce a plurality of pulse series. Alternatively, ring gears having teeth different in numbers are provided with the rotary member 1, and a plurality of rotary sensors are arranged in parallel to each other. The detection pulses P derived from the respective rotary sensors 3 may be entered as a plurality of pulse series into the microcomputer 20.

What is claimed is:

1. An engine-controlling rpm calculating apparatus, comprising:
    a rotary sensor for producing a detection pulse in response to an rpm related to the engine; and
    a microcomputer for calculating said rpm based upon said detection pulse so as to control said engine, wherein:
        said detection pulse contains a plurality of pulse series;
        said microcomputer causes a detection time instant and a pulse number for a plurality of pulse series of said detection pulse to be stored;
        said microcomputer selects one pulse series from said plurality of pulse series in response to a drive region of said engine; and
        said microcomputer calculates the rpm related to said engine based upon both the detection time instant and the pulse number of the selected pulse series.

2. An engine-controlling rpm calculating apparatus as claimed in claim 1, further comprising:
    a 1/2 frequency dividing circuit interposed between said rotary sensor and said microcomputer;
    wherein said 1/2 frequency dividing circuit frequency-divides the detection pulse derived from the rotary sensor to thereby produce a frequency division pulse containing a rising edge and a falling edge; and
    where said microcomputer selectively detects at least one of said rising edge and said falling edge of the frequency division pulse, whereby two pulse series are substantially acquired by the microcomputer from said frequency division pulse.

3. An engine-controlling rpm calculating apparatus as claimed in claim 1 wherein:
    said microcomputer calculates at least one of an input rpm and an output rpm of a transmission of said engine as the rpm related to said region.

4. An engine-controlling rpm calculating apparatus as claimed in claim 1 wherein:
    said microcomputer sets as said drive region of the engine an intermediate rpm region between said high rpm region and said low rpm region; and
    said microcomputer switches a pulse series selected in said intermediate rpm region.

5. An engine-controlling rpm calculating apparatus as claimed in claim 4, wherein said microcomputer calculates a plurality of rpms based on said plurality of pulse series in said intermediate rpm region; and when the respective rpms calculated based upon said plurality of pulse series are made coincident with each other, said microcomputer selects the pulse series to be selected.

6. An engine-controlling rpm calculating apparatus as claimed in claim 5 wherein:
    in the case that the respective rpms calculated based upon said plurality of pulse series are not made coincident with each other in the entire region of said intermediate rpm region,
    when at least one of said respective rpms is larger than, or equal to an upper limit value of said intermediate rpm region, the microcomputer forcibly switches the present pulse series to such a pulse series corresponding to said high rpm region; and
    when at least one of said respective rpms is smaller than, or equal to a lower limit value of said intermediate rpm region, said microcomputer forcibly switches the present pulse series to such a pulse series corresponding to said low rpm region.

7. An rpm calculating apparatus for controlling an engine, comprising:
    a rotary sensor for producing a detection pulse in response to an rpm related to the engine;
    a microcomputer for calculating said rpm based upon said detection pulse so as to control said engine, and a 1/2 frequency dividing circuit interposed between said rotary sensor and said microcomputer, wherein:
wherein said 1/2 frequency dividing circuit frequency-divides the detection pulse derived from the rotary sensor to thereby produce a frequency division pulse containing a rising edge and a falling edge;
where said microcomputer selectively detects at least one of said rising edge and said falling edge of the frequency division pulse, whereby two pulse series are substantially acquired by the microcomputer from said frequency division pulse;
said microcomputer sets both a high rpm region and a low rpm region as a drive region of said engine;
said microcomputer selects a first pulse series whose pulse detection time period is long from said two pulse series in said high rpm region;
said microcomputer selects a second pulse series whose pulse detection time period is short from said two pulse series in said low rpm region; and
said microcomputer calculates the rpm related to said engine based upon both a detection time instant and a pulse number of the selected pulse series.

8. An rpm calculating apparatus for controlling an engine, comprising:
a rotary sensor for producing a detection pulse in response to an rpm related to the engine; and
a microcomputer for calculating said rpm based upon said detection pulse so as to control said engine, wherein:
said detection pulse contains a plurality of pulse series;
said microcomputer sets a high rpm region, an intermediate rpm region, and a low rpm region as a drive region of the engine, wherein said intermediate rpm region falls between said high rpm region and said low rpm region;
said microcomputer selects one pulse series from said plurality of pulse series in response to the drive region of said engine; and
said microcomputer selects a pulse series whose pulse detection time period is long from said plurality of pulse series in said high rpm region;
said microcomputer selects a pulse series whose pulse detection time period is short from said plurality of pulse series in said low rpm region;
said microcomputer switches the pulse series selected in said intermediate rpm region; and
said microcomputer calculates the rpm related to said engine based upon both the detection time instant and the pulse number of the selected pulse series.

* * * * *